C. S. FRANKLIN.
WIRELESS TELEGRAPH TRANSMITTER.
APPLICATION FILED FEB. 26, 1919.
1,304,868.
Patented May 27, 1919.
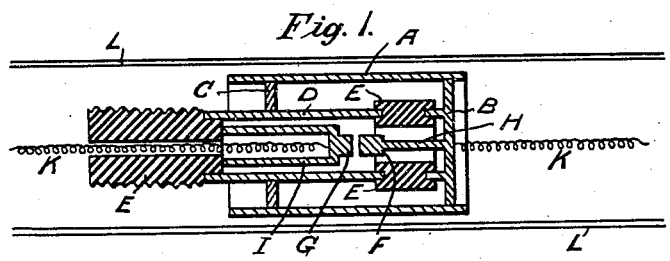
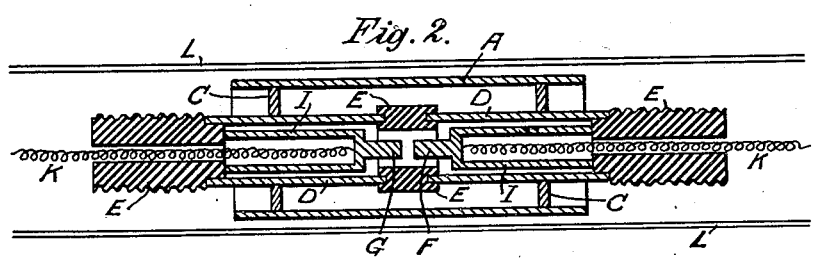
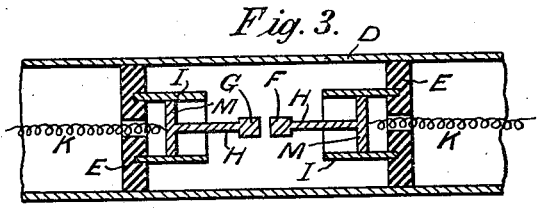
Inventor
Charles Samuel Franklin

UNITED STATES PATENT OFFICE.

CHARLES SAMUEL FRANKLIN, OF LONDON, ENGLAND, ASSIGNOR TO MARCONI WIRELESS TELEGRAPH COMPANY OF AMERICA, OF NEW YORK, N. Y., A CORPORATION OF NEW JERSEY.

WIRELESS-TELEGRAPH TRANSMITTER.

1,304,868.  Specification of Letters Patent.  Patented May 27, 1919.

Application filed February 26, 1919. Serial No. 279,397.

*To all whom it may concern:*

Be it known that I, CHARLES SAMUEL FRANKLIN, a subject of the King of Great Britain, residing at Marconi House, Strand, London, England, have invented new and useful Improvements in Wireless-Telegraph Transmitters, of which the following is a specification.

This invention relates to wireless telegraph transmitters of the coupled circuit type, and is particularly applicable to transmitters designed to emit very short waves.

In the well known Marconi type of coupled circuit transmitters the primary circuit comprises three elements, (1) a condenser, (2) an inductance, and (3) a spark gap. The energy which can be supplied per discharge to such a primary circuit depends upon the capacity of the condenser and the potential to which it can be charged, and therefore to obtain the maximum energy capacity the condenser should be of the greatest capacity possible.

The decrement of the circuit is proportional to the ratio of the high frequency resistance to the inductance. The losses due to the high frequency resistance are (a) losses at the spark gap, (b) losses in the condenser, and (c) losses in the conductors, a large portion of which is caused by eddy currents due to unequal distribution of the magnetic flux in the conductors. Practically these losses cannot be entirely prevented, but they can be greatly reduced by employing special forms of spark gap, air condensers, and a large amount of stranded copper in the conductors.

In order to make the decrement of the circuit sufficiently small it is essential that the inductance be not too much reduced, and this necessitates that for any particular frequency the condenser shall have more than a certain capacity. For the frequencies usually employed in wireless telegraphy, namely, from about 1,000,000 down to 20,000, it is not difficult to arrange the elements of the primary circuit so as to insure sufficient energy capacity with small decrement, but for frequencies of the order of 100,000,000 (three meter wave length) it becomes very difficult to arrange the elements so as to insure a similar result.

According to this invention each of the three elements of such a circuit is arranged symmetrically about a common axis.

The invention is illustrated by the accompanying drawing Figure 1 of which is a longitudinal section through the common axis while Figs. 2 and 3 are similar views of modified forms.

In Fig. 1, A is a metal cylinder, one end of which is closed by a metal disk B, while the other end is closed by a metal ring C and a co-axial cylinder D mounted between insulating blocks E. The ring C can be slid within the cylinder A for tuning purposes. The cylinder D is filled with gas under pressure. F, G, are the spark electrodes, F being carried on a rod H secured to the center of the disk B, and G being carried by a third cylinder I. K, K, are choking coils through which the condenser formed of the cylinders D, I, is charged The circuit comprises the condenser formed of the cylinders D, I, the spark gap, rod H, disk B, cylinder A and the ring C. The antenna consists of one or more rods L arranged parallel to the common axis of the cylinders and close to the outer surface of the cylinder A the closeness of the coupling depending upon the proximity of these rods to the cylinder.

In place of rods a cylindrical casing may be employed and in the limiting case of the closest coupling the antenna may consist of the cylinder A itself, which, however, in such a case should be extended in both directions to the correct length.

The cylinder A may if desired be formed of a number of parallel rods or strips upon a cylindrical surface.

In the modification shown in Fig. 2 there are two cylinders D, D, insulated from each other by blocks E, two rings C, C, and two cylinders I, I. The oscillating circuit here comprises the two condensers formed of the cylinders I, D, the spark gap, the rings C, C, and the cylinder A.

In Fig. 3, which shows the simplest construction and that most suitable for very short waves, there are a cylinder D, and two cylinders I, in each of which there is a disk M supporting a rod H carrying an electrode, the three cylinders being of course mounted on a common axis while the cylinder D, acts not only as one plate of the condenser, but also as the antenna.

It will be understood that in the arrangements of all three figures the oscillatory circuit does not include any portion of the choke coils. The high frequency circuit can be traced in each of the three arrangements as follows:

In Fig. 1, it runs from the spark terminal F through the rod H to the disk B, through the coupling cylinder A, to the disk C, to the cylinder D, by condenser action to the cylinder I, to the spark terminal G.

In Fig. 2, it runs from the spark terminal F, to cylinder I, by condenser action to cylinder D, to the disk C, to the coupling cylinder A, to the second disk C, to the second cylinder D, by condenser action to the second cylinder I, to the spark terminal G.

In Fig. 3, it runs from the spark terminal F through the rod H to the right disk M, to the right hand cylinder I, by condenser action to the coupling cylinder D, by condenser action from cylinder D to left hand cylinder I, to the disk M and through the left hand rod H to the spark terminal G.

It will be seen that the high frequency oscillations do not pass through any coils at all, the only inductance in the high frequency circuits being that of straight rods and cylinders, and it will be seen that all the parts enumerated are all coaxial with the spark gap. It will be understood, however, that, at the very high frequencies under consideration, the inductive effect of a straight rod or cylinder becomes material.

Particularly good results have been obtained by this invention which is found to possess the following great advantages for very high frequency circuits:—

1. The current distribution in the circuit is symmetrical and consequently there is no tendency to eddy currents, and losses due to this cause are eliminated. This has the great advantage that fine stranding is not required.

2. The construction is very simple and compact and the inductance can be made a minimum and the capacity a maximum.

3. Although any suitable dielectric may be employed for the condenser and spark gap, the construction lends itself particularly well to the use of compressed gas as dielectric for the condenser and spark gap, enabling very high potential to be used with minimum dielectric and spark losses.

What I claim is:—

1. A wireless telegraph transmitter comprising a closed oscillating circuit in which each of the three elements, the condenser, the inductance and the spark gap, is arranged symmetrically upon a common axis.

2. In a wireless telegraph transmitter, the combination of two coaxial cylinders constituting the plates of a condenser, an inductance arranged symmetrically about the common axis of the cylinders, and a spark gap on that axis.

3. In a wireless telegraph transmitter, the combination of two coaxial cylinders constituting the plates of a condenser, an inductance and an antenna both arranged symmetrically about the common axis of the cylinders, and a spark gap on that axis.

4. In a wireless telegraph transmitter, the combination of two coaxial cylinders constituting the plates of a condenser, an inductance arranged symmetrically about the common axis of the cylinders, terminals of a spark gap on that axis and choking coils connected to the terminals and arranged on that axis.

5. In a wireless telegraph transmitter, the combination of two coaxial cylinders constituting the plates of a condenser, an inductance and an antenna both arranged symmetrically about the common axis of the cylinders, terminals of a spark gap on that axis and choking coils connected to the terminals and arranged on that axis.

6. A wireless telegraph transmitter comprising three elements, a condenser, a variable inductance and spark gap, each of which is arranged symmetrically upon a common axis.

CHARLES SAMUEL FRANKLIN.

Witnesses:
GEORGE J. LENSTY,
LEON DE SOUSA.